United States Patent

Stöcker

[11] Patent Number: 5,529,379
[45] Date of Patent: Jun. 25, 1996

[54] GUIDING SLEEVE FOR THE HEADRESTS IN SEATS OF VEHICLES

[75] Inventor: Jürgen Stöcker, Eisingen, Germany

[73] Assignee: ITW-ATECO GmbH, Norderstedt, Germany

[21] Appl. No.: 394,979

[22] Filed: Feb. 27, 1995

[30] Foreign Application Priority Data

Mar. 19, 1994 [DE] Germany .................... 44 09 557.0

[51] Int. Cl.⁶ .................................................. A47C 7/36
[52] U.S. Cl. ................................. 297/410; 297/463.1
[58] Field of Search ................................. 297/410, 391, 297/463.1; 248/297.3, 408; 403/106, 107, 109, 377

[56] References Cited

U.S. PATENT DOCUMENTS

| | | | |
|---|---|---|---|
| 3,853,416 | 12/1974 | Hanan | 403/377 X |
| 4,411,470 | 10/1983 | Nishimura et al. | 297/410 |
| 4,427,233 | 1/1984 | Matumoto | 297/391 |
| 4,489,979 | 12/1984 | Zyngier | 297/410 |
| 4,577,904 | 3/1986 | Wiese et al. | 297/410 |
| 4,604,777 | 8/1986 | Meeks | 297/410 X |
| 5,156,440 | 10/1992 | Vidwans | 297/410 |

FOREIGN PATENT DOCUMENTS 3301073  7/1984  Germany ........................ 297/391

Primary Examiner—Milton Nelson, Jr.
Attorney, Agent, or Firm—Schwartz & Weinrieb

[57] ABSTRACT

A guiding sleeve for the headrests in seats of vehicles which slidably receives a rod of the headrest comprising at least one snap-in stop, the sleeve bore at the upper end including an extension for receiving a spring element which with a first portion cooperates with said headrest rod and with a second portion is supported by the wall of the extension. An unlocking element with two parallel spaced legs are arranged in the extension, which legs, being located at the side of the sleeve bore, with their ends cooperate with the first portion of the spring element and are movable from a gripping position engaging the spring element towards their longitudinal extension which causes the first spring portion to drop out of engagement with the rod. The spring spring comprises a pair of spring legs connected to a cross arm which spring legs engage the rod at the side, the cross arm being supported by the wall of the extension, and the unlocking element between the legs comprising a cam surface cooperating with the ends of the spring legs so that the spring legs are bent away from the rod when moving the grip into the extension.

20 Claims, 1 Drawing Sheet

GUIDING SLEEVE FOR THE HEADRESTS IN SEATS OF VEHICLES

FIELD OF THE INVENTION

The invention relates to a guiding sleeve for the headrests of seats of vehicles which slidably receives a rod of the headrests so as to permit adjustment of the headrests.

BACKGROUND OF THE INVENTION

The abovenoted guiding sleeves of plastic material or metal are inserted into the back rests of the seats from above. They allow the slidable accommodation of a rod of a headrest so that the height of the headrest can be adjusted accordingly. As a result of a corresponding frictional engagement or releasable lock-in position, the headrest can be adjusted to the desired height each time. According to safety regulations, the headrest for security reasons must not be removed from the back rest under a corresponding load.

From German Patent DE 33 01 073 a guiding sleeve has become known which, on the one hand, provides a safe locking mechanism for preventing the rod from being removed and, on the other hand, allows a simple and effective unlocking control. This is realized in that the sleeve bore at the upper end includes an extension which receives an elongated spring element. A long front side of the spring element cooperates with the rod of the headrest and with a long rear side which is supported by the wall of the extension. In the extension an unlocking element is arranged comprising two parallel spaced legs which with their ends cooperate with the ends of the spring element, while being located at the side of the sleeve bore, and are movable from a grip to the spring element and towards the longitudinal extension.

The known guiding sleeve necessitates that an abutment in the form of a notch or the like is arranged on the rod in the direction of load. Consequently, the rod needs to be dimensioned accordingly so as to withstand the prescribed load. Moreover, the notch needs to be dimensioned at a sufficient depth so as to ensure a safe abutment preventing the rod from being removed. Finally, the stop spring provided for use with the known guiding sleeve involves a relatively great expense for production.

OBJECT OF THE INVENTION

It is the object of the invention to provide a guiding sleeve for the headrests of seats of vehicles which allows a more suitable dimensioning of the headrest rod, with the locking spring simultaneously comprising a more simple structure.

SUMMARY OF THE INVENTION

According to the invention, at least one spring leg connected to a cross arm engages the headrest rod at the side thereof. Therefore, a lateral notch needs to be provided in the headrest rod. The resulting weakening of the cross section is thus normal to the main load direction. Consequently, the headrest rod can be dimensioned smaller which results in a saving of material and weight.

The inventive guiding sleeve also accommodates a more simple spring geometry which simplifies production and installation of the spring. According to a particularly preferred embodiment of the invention, there are provided two parallel spaced spring legs comprising approximately parallel leg portions which engage the headrest rod while being arranged diametrically opposite to each other. Accordingly, the unlocking element also comprises two cam surfaces which bend the spring legs apart when actuating the grip. As a result, the lock-in reliability is increased in consequence of the spring acting in a self-centering way. Moreover, there, in this way, has been provided a uniform actuating system for guiding sleeves for different head inclinations. Besides, to uniformalize the headrests in vehicles it is also possible to provide the rod with a double notch, for instance. This allows the use of one headrest for both the front and back seat.

According to an embodiment of the invention, provision is made for the unlocking element to be U-shaped and for the cross arm to be flush with the outer contour of the sleeve at rest. The unlocking element, for instance, may be a one-piece moulding of plastic material which is inserted into the extension through an opening provided in the extension.

According to a further embodiment of the invention, provision is made for the legs to comprise snap-in noses at the outside which cooperate with snap-in projections of the extensions in such a way that as a result of the pressure of the spring element the movement of the legs is limited outwardly. While inserting the unlocking element into the extension the legs are thus slightly bent towards each other so as to allow the snap-in noses to snap behind the snap-in projections and to, in this way, limit the resting position of the unlocking element.

To obtain a satisfactory guidance of the unlocking element, a further embodiment of the invention provides that the legs are guided by parallel spaced wall portions of the extension. The guidance takes care that, while manually imparting pressure on the unlocking element, the forces are approximately uniformly distributed on the spring element in order to prevent the spring legs from being bent up so as to be of varying width.

To bring the legs of the unlocking element or their snap-in noses out of engagement with the snap-in projections, according to another embodiment of the invention, provision is made for openings provided at the level of the extension and the legs of the unlocking element and face to face with the same. An object, for instance a screw driver, may be inserted through tile openings and force the legs inwardly so as to free the unlocking element from the snap-in projections.

According to a further embodiment of the invention, the wall of the extension comprises a recess engaging a cranked portion of the spring arm for lateral fixing. The spring arm, on the one hand, is supported by the rear wall of the extension and, on the other hand, is supported by the cam surfaces. At the side, the spring legs are engaging the rod so that the spring is safely secured.

According to a yet further embodiment of the invention, the free ends of the spring legs are bent outwardly to allow an easier actuation and the bent off end portion extend at approximately the same angle as the ramp-like cam surfaces.

BRIEF DESCRIPTION OF THE DRAWINGS

Various other objects, features, and attendant advantages of the present invention will be more fully appreciated from the following detailed description when considered in connection with the accompanying drawings, in which like reference characters designate like or corresponding parts throughout the several views, and wherein.

DETAILED DESCRIPTION OF THE PREFERRED EMBODIMENT

Figure 1:
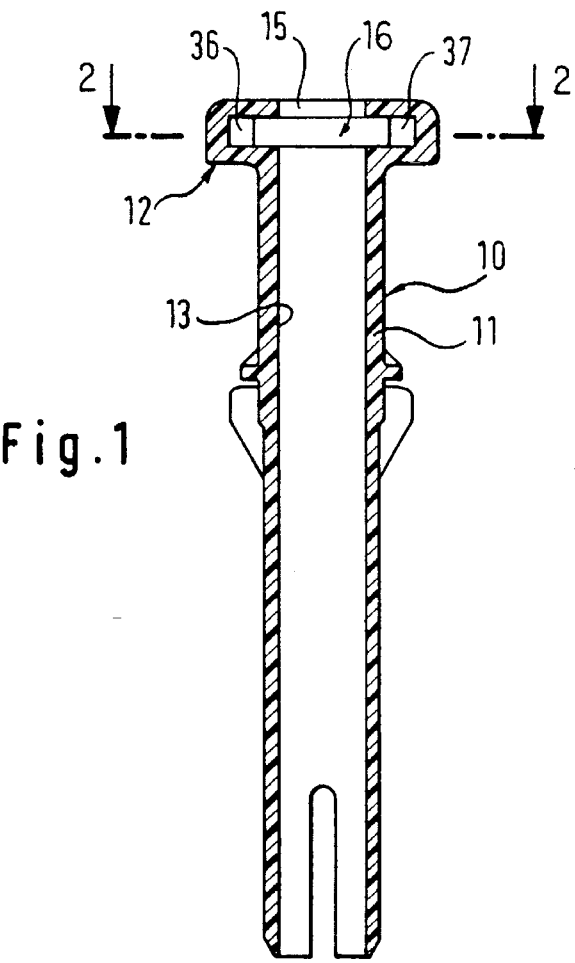
FIG. 1 is a longitudinal section through a guiding sleeve according to the invention as shown in FIG. 2 and taken along line 1—1 of FIG. 2, with the rod and spring element removed for purposes of clarity.
Figure 2:
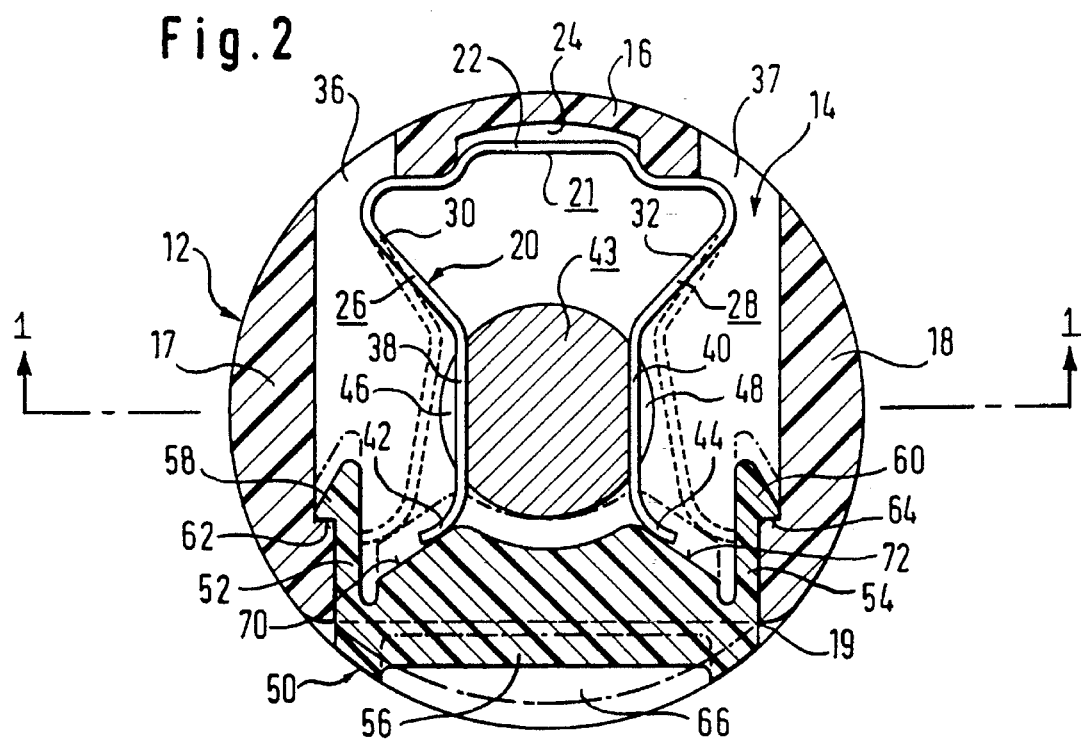
FIG. 2 is an enlarged section through the guiding sleeve of FIG. 1 taken along line 2—2.

The guiding sleeve shown in FIG. 1 is generally indicated by the reference number 10. It comprises a cylindrical hollow sleeve portion 11 as well as a head 12 radially projecting from the sleeve portion 11. As appears from FIG. 2, the head comprises an approximately circular outline. Within the area of the head 12 a cylindrical bore 13 of the sleeve portion 11 is provided with an approximately rectangular extension 14 which at 15 is narrowed to the diameter of the bore 13 again. The recess or extension 14 is limited by a rear wall 16 and by side wall portions 17, 18. An opening 19 extending over the entire width of the head 12 is provided opposite to the rear wall 16. A spring element 20 is arranged within the extension 14. It is substantially U-shaped and comprises an arm 21 which with a cranked central portion 22 engages a recess 24 at the inside of the rear wall 16. On both sides of the recess 24 the arm portion 21 is fully supported by the rear wall 16. Two spring legs 26, 28 are connected to the cross arm 21 and comprise portions 30, 32 converging away from the ends of the cross arm 21 and changing into parallel leg portions 38, 40. At their ends the leg portions 38, 40 comprise portions 42, 44 which are curved outwardly. A rod 43 of a headrest adapted to be inserted into the guiding sleeve 10, which in FIG. 2 is shown in section only, comprises notches 46, 48 which are arranged diametrically opposite to each other and functioning as abutments which shall prevent the rod 43 from being removed from the sleeve 10. In the other areas the rod 43 is circular. As soon as the rod 43 is moved upwardly the two leg portions 38, 40 lock into notches 46, 48 and prevent the rod 43 from being further removed. For this purpose, the spring legs 26, 28 are pretensioned towards each other.

Besides, a locking element 50 is inserted into the extension 14 which comprises two parallel legs 52, 54 which at one end are connected to each other by means of an arm 56. The straight outer surfaces of the legs 52, 54 towards the extension 14 in the front area are dimensioned so as to allow the legs to be guided by the corresponding inner wall portions of the side walls 17, 18. The legs 52, 54 in their rear end portions comprise snap-in noses 58, 60 which snap behind snap-in shoulders 62, 64 as soon as the unlocking element 50 has been completely inserted into the extension 14. The unlocking element 50 at its outer surface which has been adapted to the circular outline of the head 12 comprises a recess 66 into which a finger can be inserted for pressing in the unlocking element 50 as shown by the dotted line.

The arm 56 of the unlocking element 50 at its inner surface comprises two ramp-like cam surfaces 70, 72 engaging the curved end portions 42, 44 of the spring 20. In this way, the unlocking element 50 is kept at its shown position, that is, a close fit of the snap-in noses 58, 60 with the snap-in shoulders 62, 64. If, however, the unlocking element 50 is pressed into the extension 14, the cam surfaces 70, 72 cause the spring legs 26, 28 to bend apart, as shown in FIG. 2, so as to allow the rod 43 to be easily removed from the guiding sleeve 10. The rear wall 16 has been provided with two openings 36, 37 which are arranged opposite to the ends of the legs 52, 54. The ends of the legs 52, 54 comprise lateral oblique surfaces so that any object inserted through the openings 36, 37 and engaging the oblique surfaces is capable of deforming the legs towards each other in order to bring the snap-in noses 58, 60 out of engagement with the snap-in shoulders 62, 64. In this way, the unlocking element 50 and also the spring 20 can be easily removed from the extension 14. It goes without saying that the length of the cross arm 21 is smaller than the distance between the wall portions 17, 18 in the area of the opening 19.

Finally, it should be mentioned that in the drawing according to FIG. 1 only the sleeve itself but not the spring 20 is shown.

Obviously, many modifications and variations of the present invention are possible in light of the above teachings. It is therefore to be understood that within the scope of the appended claims, the present invention may be practiced otherwise than as specifically described herein.

I claim:

1. A guiding sleeve assembly for housing a rod member so as to maintain said rod member within said assembly and permit said rod member to be removed from said assembly, comprising:

a guide sleeve member having an opening defined within an outer peripheral surface thereof;

a cavity, defined by at least a pair of laterally spaced side walls, defined within said guide sleeve member and adapted to have said rod member pass therethrough;

a spring element disposed within said cavity and comprising a pair of leg portions for releasably engaging opposite sides of said rod member so as to retain said rod member within said assembly when said leg portions of said spring element are engaged with said opposite sides of said rod member and for permitting said rod member to be removed from said assembly when said leg portions of said spring element are disengaged from said opposite sides of said rod member; and an unlocking element disposed within said cavity and engaged with said spring element such that said spring element biases said unlocking element to a first position within said cavity at which said unlocking element is disposed within said opening of said guide sleeve member so as to be accessible from a point external of said guide sleeve member, said unlocking element engages said side walls of said guide sleeve member such that said unlocking element is retained within said cavity while said leg portions of said spring element are permitted to engage said opposite sides of said rod member so as to retain said rod member within said assembly, and wherein said unlocking element is movable from said first position to a second position within said cavity by a force applied to said unlocking element from a position external of said guide sleeve member and against the biasing force of said spring element so as to cause said leg portions of said spring element to be disengaged from said opposite sides of said rod member so as to permit said rod member to be removed from said assembly.

2. The assembly as set forth in claim 1, wherein:

said rod member comprises an element of a vehicle seat headrest.

3. The assembly as set forth in claim 1, wherein:

an end wall portion of said sleeve member defining said cavity and disposed opposite said unlocking element comprises aperture means for permitting insertion therethrough of a tool for engaging said unlocking element so as to disengage said unlocking element from said cavity and permit removal of said unlocking element from said cavity.

4. The assembly as set forth in claim 1, wherein:

said spring element is generally U-shaped in configuration; and said pair of leg portions are adapted to releasably engage diametrically opposite sides of said rod member.

5. The assembly as set forth in claim 4, wherein:

said diametrically opposite sides of said rod member comprise notch means defined therein for housing said pair of leg portions of said spring element when said leg portions of said spring element are engaged with said rod member.

6. The assembly as set forth in claim 4, wherein:

an end wall portion of said guide sleeve member defining said cavity is disposed opposite to said unlocking element so as to support a cross-arm portion of said spring element, which interconnects said pair of leg portions of said spring element, such that said spring element is interposed between said end wall portion of said guide sleeve member and said unlocking element.

7. The assembly as set forth in claim 1, wherein:

said unlocking element has a generally U-shaped configuration comprising a central body portion and a pair of legs disposed upon opposite sides of said central body portion.

8. The assembly as set forth in claim 7, wherein:

said central body portion of said unlocking element comprises cam means for engaging end portions of said leg portions of said spring element for divergently biasing said leg portions of said spring element apart with respect to each other when said unlocking element is moved toward said second position so as to disengage said leg portions of said spring element from said rod member.

9. The assembly as set forth in claim 7, wherein:

said central body portion of said unlocking element has a recess defined within an external portion thereof for receiving a user's finger so as to move said unlocking element into said cavity from said first position to said second position.

10. The assembly as set forth in claim 7, wherein:

said laterally spaced side walls of said sleeve member defining said cavity comprise a pair of shoulder portions; and said pair of legs of said unlocking element comprises nose portions for snap-engaging said shoulder portions so as to lockingly retain said unlocking element within said cavity of said sleeve member in opposition to said biasing force of said spring element.

11. The assembly as set forth in claim 10, wherein:

an end wall portion of said sleeve member defining said cavity and disposed opposite said unlocking element comprises aperture means for permitting insertion therethrough of a tool into said cavity for engaging said nose portions of said legs of said unlocking element so as to disengage said nose portions of said legs of said unlocking element from said shoulder portions of said sleeve member so as to permit removal of said unlocking element from said cavity of said sleeve member.

12. A guide sleeve mechanism for use within a vehicle headrest assembly, comprising:

a headrest component comprising a rod member;

a guide sleeve member for removably receiving said rod member of said headrest component and having an opening defined within an outer peripheral surface of said guide sleeve member;

a cavity, defined by at least a pair of laterally spaced side walls of said guide sleeve member, defined within said guide sleeve member and adapted to have said rod member pass therethrough;

a spring element disposed within said cavity and comprising a pair of leg portions for releasably engaging opposite sides of said rod member so as to retain said rod member within said guide sleeve member when said leg portions of said spring element are engaged with said opposite sides of said rod member and for permitting said rod member to be removed from said guide sleeve member when said leg portions of said spring element are disengaged from said opposite sides of said rod member; and an unlocking element disposed within said cavity and engaged with said spring element such that said spring element biases said unlocking element to a first position within said cavity at which said unlocking element is disposed within said opening of said guide sleeve member so as to be accessible from a position external of said guide sleeve member, said unlocking element engages said side walls of said guide sleeve member such that said unlocking element is retained within said cavity of said guide sleeve member while said leg portions of said spring element are permitted to engage said opposite sides of said rod member so as to retain said rod member within said guide sleeve member, and wherein said unlocking element is movable from said first position to a second position within said cavity by a force applied to said unlocking element from a position external of said guide sleeve member and against the biasing force of said spring element so as to cause said leg portions of said spring element to be disengaged from said opposite sides of said rod member so as to permit said rod member to be removed from said assembly.

13. The mechanism as set forth in claim 12, wherein:

said spring element is generally U-shaped in configuration such that said pair of leg portions releasably engage diametrically opposite sides of said rod member.

14. The mechanism as set forth in claim 13, wherein:

said diametrically opposite sides of said rod member comprise notch means defined therein for housing said pair of leg portions of said spring element when said leg portions of said spring element are engaged with said opposite sides of said rod member.

15. The mechanism as set forth in claim 13, wherein:

an end wall portion of said guide sleeve member defining said cavity is disposed opposite to said unlocking element so as to support a cross-arm portion of said spring element, which interconnects said pair of leg portions of said spring element, such that said spring element is interposed between said end wall portion of said guide sleeve member and said unlocking element.

16. The mechanism as set forth in claim 12, wherein:

said unlocking element has a generally U-shaped configuration comprising a central body portion and a pair of leg portions disposed upon opposite sides of said central body portion.

17. The mechanism as set forth in claim 16, wherein:

said central body portion of said unlocking element comprises cam means for engaging end portions of said leg portions of said spring element so as to divergently bias said leg portions of said spring element apart with respect to each other when said unlocking element is moved toward said second position and thereby disengage said leg portions of said spring element from said opposite sides of said rod member.

18. The mechanism as set forth in claim 16, wherein:

said central body portion of said unlocking element has a recess defined within an external portion thereof for receiving a user's finger so as to move said unlocking element into said cavity from said first position to said second position.

19. The mechanism as set forth in claim 16, wherein:

said side walls of said guide sleeve member defining said cavity comprise a pair of shoulder portions; and said pair of leg portions of said unlocking element comprise nose portions for snap-engaging said shoulder portions of said side walls of said guide sleeve member so as to lockingly retain said unlocking element within said cavity of said guide sleeve member in opposition to said biasing force of said spring element.

20. The mechanism as set forth in claim 19, wherein:

an end wall portion of said guide sleeve member defining said cavity and disposed opposite to said unlocking element comprises aperture means for permitting insertion of a tool therethrough and into said cavity for engaging said nose portions of said legs portions of said unlocking element so as to disengage said nose portions of said leg portions of said unlocking element from said shoulder portions of said side walls of said guide sleeve member so as to permit removal of said unlocking element from said cavity of said sleeve member.

* * * * *